United States Patent [19]

Ebert

[11] 4,021,133
[45] May 3, 1977

[54] TAP DRIVER APPARATUS

[75] Inventor: Gary R. Ebert, Dearborn, Mich.

[73] Assignee: Ex-Cell-O Corporation, Troy, Mich.

[22] Filed: Apr. 16, 1975

[21] Appl. No.: 568,804

[52] U.S. Cl. .................. 408/141; 10/89 F; 279/16; 408/714
[51] Int. Cl.² .................................. B23G 3/06
[58] Field of Search .......... 408/141, 142, 139, 714; 10/135 N, 135 R, 89 H, 89 F, 141 H; 279/16, 17, 18

[56] References Cited
UNITED STATES PATENTS

| 2,287,192 | 6/1942 | Mueller | 408/139 |
| 2,609,551 | 9/1952 | Marcellus | 408/139 |
| 3,030,818 | 4/1962 | Zagar | 408/141 X |

Primary Examiner—Othell M. Simpson
Assistant Examiner—Z. R. Bilinsky

[57] ABSTRACT

This invention is an apparatus to provide for a tap driver system that maintains alignment of a tap at the start of engagement and permits a limited amount of linear movement by providing a tension spring mounting system to connect the tap holder assembly and the tap assembly.

1 Claim, 3 Drawing Figures

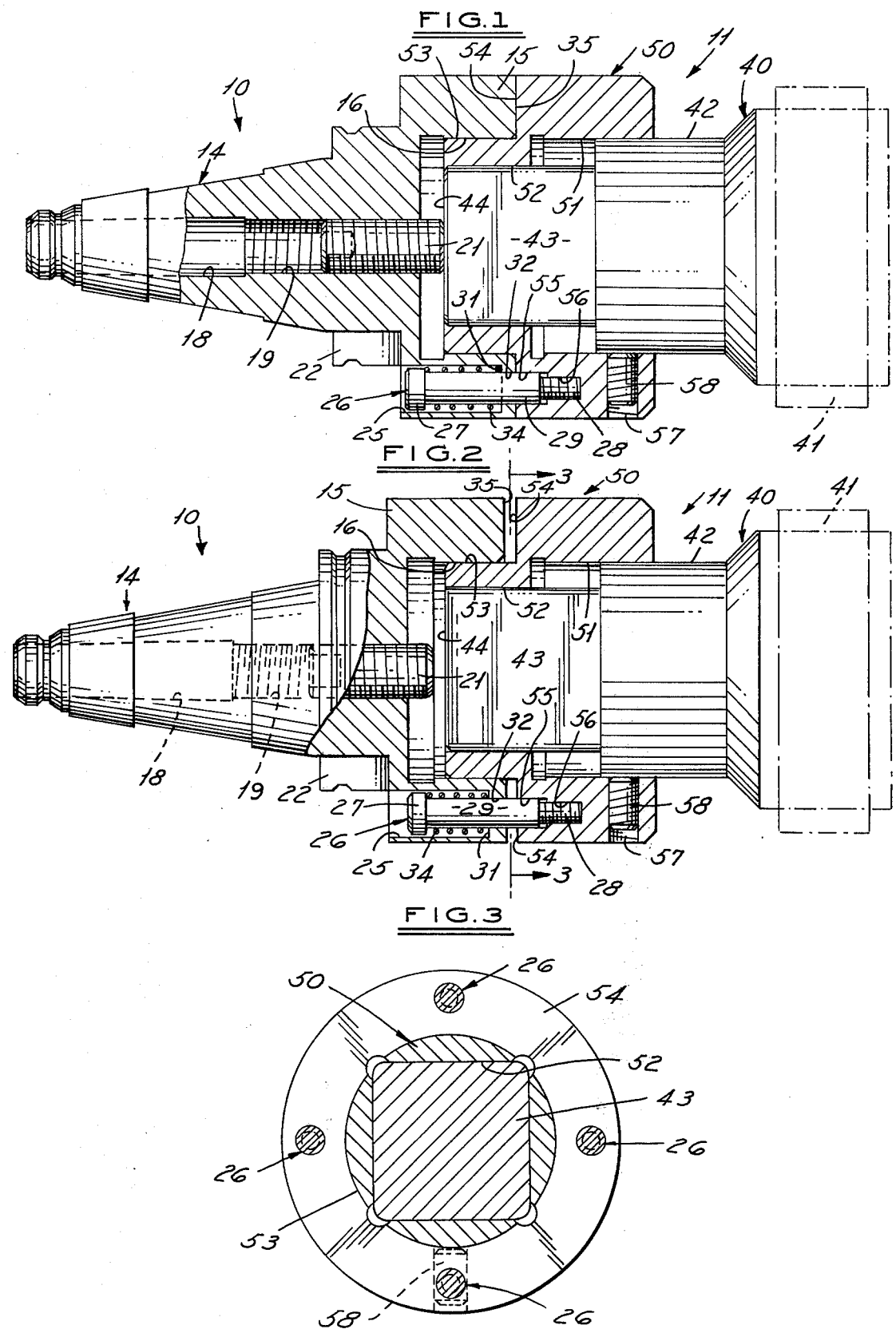

TAP DRIVER APPARATUS

SUMMARY OF THE INVENTION

This invention relates to a tap driver system and in particular to a tap holder assembly which works with a tap assembly to permit linear movement of the tap assembly in reference to the tap holder assembly. This eliminates the need for a high degree of accuracy between the feed of the tap and the lead of the thread being cut and has special application in use with large taps.

A BRIEF DESCRIPTION OF THE DRAWINGS

FIG. 1 is a side sectional view of a tap assembly mounted in a tap holder assembly with the tap assembly in a retracted position.

FIG. 2 is a side sectional view of a tap assembly mounted in a tap holder assembly as shown in FIG. 1 with the tap assembly in an extended position.

FIG. 3 is a sectional view of the tap head in the bushing member mounted in the shank flange and taken along line 3—3 of FIG. 2 and looking in the direction of the arrows of line 3—3.

DESCRIPTION OF THE INVENTION

A tap holder assembly 10 is mounted in a spindle driving unit (not shown) as is well known in the art. A tap assembly 11 is mounted in the tap holder assembly 10 as will be covered in more detail below.

The tap holder assembly 10 has a shank 14 with a shank flange 15. Flange 15 has a linear bore 16. The shank 14 is provided with an internal opening 18 which has a threaded hole 19. A stopper bolt 21 is positioned in the threaded hole 19 and a detailed description of its function will be given below. A drive key slot 22 is provided so the tap holder assembly 10 can be keyed to the spindle driving unit.

In the present invention four spring bores 25 are provided in the shank flange 15. Soulder screws 26 are positioned in the bores 25. The screws 26 have a head member 27 and a threaded end 28 connected by a locating body 29.

The spring bore 25 has a bore bottom 31 and a locating bore 32.

A tension spring 34 is positioned in the spring bore 25 and acts between head member 27 and bore bottom 31. The shank flange 15 has a shank locating face 35. The detailed function of these elements will be given below.

The tap assembly 11 has a tap head 40 and a bushing 50. The tap head 40 has a tap cutter 41, a locating surface 42, a driver end 43 and a bottom locating surface 44. The detailed function of these elements will be given below.

The bushing 50 has a locating bore 51, a driver hole 52, a linear locating surface 53, a bushing locating face 54, a locating bore 55 aligned with locating bore 32 and having a threaded hole 56 at its end, and a threaded hole 57 which has a set screw 58. The detailed functions of these elements will be given below.

Before the tap holder assembly 10 is placed in a spindle driving unit the stopper bolt 21 is positioned in threaded hole 19 so its end extends into linear bore 16 a predetermined distance.

The bushing 50 is placed in the shank flange 15 so that the linear locating surface 53 contacts linear bore 16 and shank locating face 35 comes in contact with bushing locating face 54. At the same time locating bore 55 is aligned with locating bore 32.

Tension spring 34 is placed in spring bore 25 and shoulder screw 26 is passed through tension spring 34 and locating body 29 provides accurate alignment of shank 14 and the bushing 50 by engaging locating bores 32 and 55. Threaded end 28 is then turned into threaded hole 56. As the shoulder screw 26 is screwed into threaded hole 56 head member 27 acts on tension spring 34 compressing it with bore bottom 31. As mentioned above and seen in FIG. 3 there are four shoulder screws in the present illustration. They act as stated above and cause a predetermined pre-load to be provided by their interact with the tension springs 34.

The tap holder assembly 10 and the bushing 50 can now be mounted on the spindle driving unit (not shown). The drive key slot 22 will be aligned with a key and a key slot to transmit the driving power to the system.

The tap head 40 can be determined and mounted at this time. In the present illustration the driver hole 52 and the driver end 43 are in a square shape to provide for transmission of the driving power. The tap head 40 is moved into the bushing 50 until the bottom locating surface 44 contacts stopper bolt 21. The set screw 58 is then turned into threaded hole 57 and secures tap head 40 in the bushing 50 by acting on locating surface 42 causing it to make securing contact with locating bore 51.

When a tapping operation is to take place the feed of the unit will be a little less than needed feed rate of the tap assembly 11. This will cause the tap assembly 11 to want a faster linear movement than the tap holder assembly 10 is being moved. The bushing 50 will move linearly away from the shank flange 15 as viewed in FIG. 2, the bottom locating surface 44 has moved off of stopper bolt 21 and bushing locating face 54 has moved out of contact with shank locating face 35. The inner action of linear locating surface 53 and linear bore 16 maintains the axial alignment of the various parts.

While it is felt by the inventor that this invention has been set forth in as full a description as possible, it is understood that modifications could be made to this tap driver apparatus without departing from the scope of the following claims.

What I claim is:

1. An axially extending tap drive apparatus comprising a tap holder assembly comprising a housing having a rearward portion adapted to be gripped in a tool holder and having a forward portion provided with a centrally disposed opening, a threaded opening positioned rearwardly and centrally of said opening and communicating therewith, a bolt threadably and adjustably positioned in said threaded opening, a tap assembly comprising a bushing and a tap head, said bushing having an opening extending throughout its length and having a stepped portion on the exterior surface thereof, said stepped portion engaging the forward portion of said housing to thereby align the housing and bushing with respect to each other while limiting the inward movement of the bushing, said tap head being positioned in said bushing and having one end extending into said bushing opening and engaging said adjustably positioned bolt to limit its inward movement and axially position said tap head with respect to said housing, a bit adapted to be secured to the other end of said head, means removably securing said tap head in said bushing, securing means mounting said tap assembly to said tap holder assembly and permitting a limited linear movement of one with respect to the other, said securing means including a plurality of bolts located in aligned bores disposed parallel to said axis and positioned in said housing and bushing, respectively, for maintaining the same in alignment, and resilient means positioned about each of the bolts and being compressible when said bolts are urged into said aligned bores whereby said tap head and said bushing rotate in unison but more axially away from said holder when said bit is drawn into a work piece.

* * * * *